US011444736B2

(12) United States Patent
Nguyen et al.

(10) Patent No.: US 11,444,736 B2
(45) Date of Patent: Sep. 13, 2022

(54) DEVICES AND METHODS FOR EXCHANGING CHANNEL STATE INFORMATION

(71) Applicant: Huawei Technologies Co., Ltd., Shenzhen (CN)

(72) Inventors: Van Minh Nguyen, Boulogne Billancourt (FR); Marco Maso, Boulogne Billancourt (FR); Merouane Debbah, Boulogne Billancourt (FR)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/692,780

(22) Filed: Nov. 22, 2019

(65) Prior Publication Data

US 2020/0092067 A1    Mar. 19, 2020

Related U.S. Application Data

(63) Continuation of application No. PCT/EP2017/078236, filed on Nov. 3, 2017.

(30) Foreign Application Priority Data

May 23, 2017   (WO) ................. PCT/EP2017/062377

(51) Int. Cl.
*H04L 5/00*        (2006.01)
*H04B 7/06*        (2006.01)
(Continued)

(52) U.S. Cl.
CPC ......... *H04L 5/0053* (2013.01); *H04B 7/0417* (2013.01); *H04B 7/0626* (2013.01);
(Continued)

(58) Field of Classification Search
CPC ................. H04L 5/0053; H04L 5/0057; H04L 5/0051; H04L 1/0693; H04B 7/0417; H04B 7/0626; H04B 7/0658; H04W 72/085
See application file for complete search history.

(56) References Cited

U.S. PATENT DOCUMENTS

2008/0305818 A1* 12/2008 Ko .......................... H04L 5/023
                                                                    455/509
2009/0276674 A1   11/2009 Wei et al.
(Continued)

FOREIGN PATENT DOCUMENTS

CN         1968242 A      5/2007
CN       102783233 A     11/2012
(Continued)

OTHER PUBLICATIONS

Choi et al., "Interpolation Based Transmit Beamforming for MIMO-OFDM With Limited Feedback," IEEE Transactions on Signal Processing, vol. 53, No. 11, pp. 4125-4135, XP011141126, Institute of Electrical and Electronics Engineers, New York, New York (Nov. 2005).

(Continued)

*Primary Examiner* — Kiet Tang
(74) *Attorney, Agent, or Firm* — Leydig, Voit & Mayer, Ltd.

(57) ABSTRACT

The application relates to a communication device comprising: a communication interface configured to transmit a pilot signal via a communication channel to a second communication device and to receive a plurality of data elements representing channel state information (CSI) from the second communication device, wherein the plurality of data elements are a subset of a set of data elements representing the full channel state information (CSI) being available at the second communication device; and a processing unit configured to generate the full channel state information (CSI) on the basis of the plurality of data elements by (Continued)

applying a fitting scheme to the plurality of data elements received from the second communication device.

15 Claims, 9 Drawing Sheets

(51) Int. Cl.
  *H04W 72/08* (2009.01)
  *H04B 7/0417* (2017.01)
(52) U.S. Cl.
  CPC .......... *H04L 5/0051* (2013.01); *H04L 5/0057* (2013.01); *H04W 72/085* (2013.01)

(56) References Cited

U.S. PATENT DOCUMENTS

| | | | |
|---|---|---|---|
| 2011/0170622 A1 | 7/2011 | Nakayama | |
| 2011/0176624 A1 | 7/2011 | Annavajjala et al. | |
| 2012/0213111 A1 | 8/2012 | Shimezawa et al. | |
| 2012/0213261 A1 | 8/2012 | Sayana et al. | |
| 2013/0201912 A1 | 8/2013 | Sheng et al. | |
| 2014/0140336 A1* | 5/2014 | Callard | H04L 25/0202 370/343 |
| 2014/0355529 A1* | 12/2014 | Zhu | H04B 7/0417 370/329 |
| 2015/0373736 A1 | 12/2015 | Ji et al. | |
| 2016/0050007 A1 | 2/2016 | Lee et al. | |
| 2016/0072562 A1 | 3/2016 | Onggosanusi et al. | |
| 2016/0142115 A1 | 5/2016 | Onggosanusi et al. | |
| 2016/0156397 A1 | 6/2016 | Onggosanusi et al. | |
| 2018/0106857 A1* | 4/2018 | Otte | H03M 1/109 |
| 2018/0123653 A1* | 5/2018 | Wang | H04L 1/0026 |
| 2019/0312615 A1* | 10/2019 | Wu | H04B 7/0626 |

FOREIGN PATENT DOCUMENTS

| | | |
|---|---|---|
| CN | 103597891 A | 2/2014 |
| WO | 2014163451 A1 | 10/2014 |

OTHER PUBLICATIONS

Jiang et al., "Achievable Rates of FDD Massive MIMO Systems With Spatial Channel Correlation," IEEE Transactions on Wireless Communications, vol. 14, No. 5, pp. 2868-2882, Institute of Electrical and Electronics Engineers, New York, New York (May 2015).

Hooman Shirani-Mehr et al., "Channel State Feedback Schemes for Multiuser MIMO-OFDM Downlink," XP080407255, total 28 pages (Apr. 2008).

Sudarshan et al., "Channel Statistics-Based RF Pre-Processing with Antenna Selection," IEEE Transactions on Wireless Communications, vol. 5, No. 12, pp. 3501-3511, Institute of Electrical and Electronics Engineers, New York, New York (Dec. 2006).

Hong et al., "Spatial Multiplexing in Correlated Fading via the Virtual Channel Representation," IEEE Journal on Selected Areas in Communications, vol. 21, No. 5, pp. 856-866, Institute of Electrical and Electronics Engineers, New York, New York (Jun. 2003).

Adhikary et al., "Joint Spatial Division and Multiplexing-The Large-Scale Array Regime," IEEE Transactions on Information Theory, vol. 59, No. 10, pp. 6441-6463, Institute of Electrical and Electronics Engineers, New York, New York (Oct. 2013).

Chen et al., "Two-Tier Precoding for FDD Multi-Cell Massive MIMO Time-Varying Interference Networks," IEEE Journal on Selected Areas in Communications, vol. 32, No. 6, pp. 1230-1238, Institute of Electrical and Electronics Engineers, New York, New York (Jun. 2014).

Nam et al., "Joint Spatial Division and Multiplexing: Realizing Massive MIMO Gains with Limited Channel State Information," 2012 46th Annual Conference on Information Sciences and Systems (CISS), pp. 1-6, Institute of Electrical and Electronics Engineers, New York, New York (2012).

Liu et al., "Phase Only RF Precoding for Massive MIMO Systems With Limited RF Chains," IEEE Transactions on Signal Processing, vol. 62, No. 17, pp. 4505-4515, Institute of Electrical and Electronics Engineers, New York, New York (Sep. 1, 2014).

Chang et al., "Ultrawideband Transceiver Design Using Channel Phase Precoding," IEEE Transactions on Signal Processing, vol. 55, No. 7, pp. 3807-3822, Institute of Electrical and Electronics Engineers, New York, New York (Jul. 2007).

Zhuang et al., "Phase Preceding for Frequency-Selective Rayleigh and Rician Slowly Fading Channels," IEEE Transactions on Vehicular Technology, vol. 46, No. 1, pp. 129-142, Institute of Electrical and Electronics Engineers, New York, New York (Feb. 1997).

Molisch et al., "FFT-Based Hybrid Antenna Selection Schemes for Spatially Correlated MIMO Channels," IEEE Communications Letters, vol. 8, No. 1, pp. 36-38, Institute of Electrical and Electronics Engineers, New York, New York (Jan. 2004).

\* cited by examiner

| PROCEDURE | SIGNALING CONTAINS AT LEAST | MINIMUM SIZE OF THE SIGNALING |
|---|---|---|
| FITTING (MMSE) | $\widetilde{h_{ij,B}}(m), \widetilde{i_{ij,B}}(m)$ | $\sum_{m=1}^{L}(B_h^{(m)}+B_i^{(m)})R_m$ |
| FITTING (DYNAMIC) | $\widetilde{h_{ij,B}}(m), \widetilde{i_{ij,B}}(m)$ | $\sum_{m=1}^{L}(B_h^{(m)}+B_i^{(m)})R_m$ |
| STATIC | $\widetilde{h_{ij,B}}(m)$ | $\sum_{m=1}^{L}B_h^{(m)}R_m$ |

DEVICES AND METHODS FOR EXCHANGING CHANNEL STATE INFORMATION

CROSS-REFERENCE TO RELATED APPLICATIONS

This application is a continuation of International Application No. PCT/EP2017/078236, filed on Nov. 3, 2017, which claims priority to International Patent Application No. PCT/EP2017/062377, filed on May 23, 2017. The disclosures of the aforementioned applications are hereby incorporated by reference in their entireties.

TECHNICAL FIELD

In general, embodiments of the application relate to the field of telecommunications. More specifically, the embodiments relate to devices and methods for exchanging channel state information, in particular in wireless communication networks.

BACKGROUND

The performance of a communication system, in particular a wireless communication system, can be greatly improved when prior information about channel conditions between two ends of a communication link is available at the transmitting end. Availability of the channel conditions, or so-called channel state information (CSI), at the transmitter allows to improve effectiveness and accuracy of many operations performed at the transmitter, such as signal processing and resource allocation. In this context, designing effective procedures and algorithms for the receiver to be able to perform a timely and accurate signaling regarding channel state information (CSI) to the transmitter is paramount. However, the feasibility and effectiveness of such CSI signaling strongly depends on the system configuration and setup, e.g., the number of transmitters/receivers involved in the communication, bandwidth, the number of antennas at both communication ends, variability of the channel conditions and so on.

Generally, the acquisition of accurate and reliable CSI at the transmitter (CSIT) by means of feedback messages, i.e., signaling, from its associated receivers (hereafter also referred to as users) is not a trivial task. In fact, the conventional technique to acquire such CSIT in a feedback-based system is typically divided into two main phases: (i) transmission of a training sequence from the transmitter to the scheduled users, such that the latter can estimate the observed channel; and (ii) signaling of the channel estimation performed by the scheduled users towards the transmitter.

Evidently, the reliability of CSIT acquired through feedback signaling is subject to the time available to perform all the operations in the first and second phase. In practical systems, channels actually stay (approximately) the same only for a fixed period of time, i.e., its coherence time, whose duration strongly depends on how often the surrounding environment changes or how fast users vary their positions with respect to the transmitter. Accordingly, the channels need to be periodically re-estimated in order to keep the CSIT timely and accurate. Hence, if the time spent for CSI acquisition takes too long, little time is left to serve the users before the channels change.

In this regard, a common example are the modern multi-antenna (MIMO) systems using frequency division duplexing (FDD), wherein a widely adopted approach when the antenna array is relatively small is a direct CSI signaling from the users to the transmitter. However, the direct CSI signaling becomes hardly feasible when the antenna array becomes large. In fact, the length of a training/pilot sequence and the size of the data to be fed back per user grow linearly with the size of the antenna arrays at both ends of the communication link. In other words, the CSI acquisition overhead increases linearly with the overall number of antennas in the system. It is thus difficult to guarantee CSI reliability whenever very tight time constraints need to be satisfied, or in case of large broadband systems.

Many modern cellular systems that offer multi-user MIMO support (e.g., according to the LTE/LTE-A standards) operate on the basis of frequency division duplexing (FDD). Thus, despite being a potentially less appealing solution from a technical point of view, identification of an effective solution for acquiring accurate and timely CSIT in FDD MIMO systems is widely considered a fundamental problem that needs to be addressed.

Conventional approaches to the CSIT acquisition problem in feedback-based systems are often insufficient to fulfill requirements of modern applications and/or practical networks in terms of performance and feasibility. In practice, these approaches can be classified into two categories depending on the issues they suffer: firstly, the approaches suffering from limited performance that make use of channel statistics or codebooks (often to design the so-called pre-coders, i.e., to have digital beamformers that pre-process the base band data before transmission); secondly, the approaches suffering from limited flexibility which are based on approximated or reduced CSI feedbacks that yields good performance in case of homogeneous UEs distribution.

In codebook-based approaches (or codebook-based approaches with channel statistics), the base station selects a codeword from a pre-configured codebook and one or more user equipment feedback channel quality indicators such as Rank or SNR to the base station. For reference the codebook-based approach is described in the standardized solution, US20150373736A1, and WO2014163451A1.

In the codebook-based approach with channel statistics, the channel correlation is assumed to be perfectly known to the transmitter, which in turn judiciously designs appropriate channel training sequences and user CSIT feedback codebooks. This approach achieves dimensionality-reduction channel estimation and rather high throughput, however it requires moderate number of antennas, moderate to large channel coherence time, and is characterized by high computational complexity. For reference this approach is described in Z. Jiang et al., IEEE Trans. Wirel. Commun., vol. 14, no. 5, pp. 2868-2882, 2015.

In the approach with reduced CSI feedbacks, the transmitter serves the users using a two-stage precoder, which allows adoption of a pre-projector, so that the dimensionality of the resulting equivalent channel is reduced. performance may not be satisfying if a moderate to high CSI reduction is necessary. For reference this approach can be found in Adhikary et al., IEEE Trans. Inf. Theory, vol. 59, no. 10, pp. 6441-6463, 2013; Nam et al., 46th Annual Conference on Information Sciences and Systems (CISS), Princeton, 2012; and J. Chen and V. K. N. Lau, IEEE JSAC, vol. 32, no. 6, pp. 1230-1238, 2014.

However, the above approaches still have a critical problem: the available resources for the CSI signaling are not sufficient to perform a timely and accurate transmission for the amount of information that needs to be conveyed from the receiver to the transmitter. Thus, there is a need for improved devices and methods for exchanging CSI in a communication network.

SUMMARY

It is an object of some embodiments to provide improved devices and methods for exchanging CSI in a communication network.

The foregoing and other objects are achieved by the subject matter of the independent claims. Further implementation forms are apparent from the dependent claims, the description and the figures.

Generally, embodiments of the application are based on a CSI compression scheme and an adaptive signaling scheme to ensure timely and accurate compressed CSI feedback. In particular, according to the embodiments of the application, one or more receivers can acquire an approximated CSI estimation and signal it back to a transmitter that serves the one or more receivers such that the CSI can be efficiently reconstructed by the transmitter itself.

More specifically, according to a first aspect the application relates to a transmitter communication device, in particular a base station, comprising: a communication interface configured to transmit a pilot signal via a communication channel to a receiver communication device and to receive a plurality of data elements representing channel state information (CSI) defined, for instance, over a predefined time and/or frequency range from the receiver communication device, wherein the plurality of data elements are a subset of a set of data elements representing the full channel state information (CSI) over the predefined time and/or frequency range being available at the receiver communication device. Furthermore, the transmitter communication device comprises a processing unit configured to generate the full channel state information (CSI) on the basis of the plurality of data elements by applying a fitting scheme to the plurality of data elements received from the receiver communication device.

Thus, an improved transmitter communication device is provided which allows reducing the CSI signaling overhead by reconstructing the full CSI using a reduced set of data elements on the basis of a fitting scheme.

In a further possible implementation form of the first aspect, the processing unit is configured to generate the full channel state information (CSI) on the basis of the plurality of data elements by applying a piecewise linear fitting scheme to the plurality of data elements received from the further communication device. This implementation form allows for a computationally efficient implementation of the fitting scheme at the transmitter communication device.

In a further possible implementation form of the first aspect, the processing unit is further configured to determine a respective frequency or a respective time associated with each data element of the plurality of data elements on the basis of a plurality of data, for instance, in the form of indices received from the receiver communication device.

In a further possible implementation form of the first aspect, the full channel state information (CSI) comprises a frequency response, a time response and/or a spatial response of the communication channel to the pilot signal.

In a further possible implementation form of the first aspect, each of the plurality of data elements can comprise phase information, amplitude information, a complex value, a real part of a complex value and/or an imaginary part of a complex value.

In an implementation form, the processing unit can be configured to apply the fitting scheme to different components of the channel state information either independently or dependently, for instance, a piece-wise (linear) fitting of a phase component and an amplitude component in an independent manner or a piece-wise (linear) fitting or a real part and an imaginary part of a complex valued channel response in a cross-dependent manner. Moreover, in an implementation form, the processing unit can be configured to directly apply a fitting scheme to the complex valued channel response.

According to a second aspect the application relates to a corresponding method of operating transmitter communication device, wherein the method comprises the following steps: transmitting a pilot signal via a communication channel to a receiver communication device and receiving a plurality of data elements representing channel state information (CSI) from the receiver communication device, wherein the plurality of data elements are a subset of a set of data elements representing the full channel state information (CSI) being available at the receiver communication device; and generating the full channel state information (CSI) on the basis of the plurality of data elements by applying a fitting scheme to the plurality of data elements received from the receiver communication device.

The method according to the second aspect of the application can be performed by the transmitter communication device according to the first aspect of the application. Further features of the method according to the second aspect of the application result directly from the functionality of the transmitter communication device according to the first aspect of the application and its different implementation forms described above.

According to a third aspect the application relates to a corresponding receiver communication device comprising: a communication interface configured to receive a pilot signal from a transmitter communication device; and a processing unit configured to generate a plurality of data elements representing channel state information (CSI) by selecting a subset of a set of data elements representing the full channel state information (CSI) being available at the receiver communication device. The communication interface is further configured to transmit the plurality of data elements representing channel state information (CSI) to the transmitter communication device.

Thus, an improved receiver communication device is provided which allows reducing the CSI signaling overhead by transmitting only a reduced set of data elements representing channel state information (CSI).

In a further possible implementation form of the third aspect, the processing unit is configured to select a predefined number of data elements from the set of data elements representing the full channel state information (CSI) for generating the plurality of data elements.

In a further possible implementation form of the third aspect, the processing unit is configured to select predefined data elements from the set of data elements representing the full channel state information (CSI) for generating the plurality of data elements.

In a further possible implementation form of the third aspect, the processing unit is configured to select the predefined number of data elements from the set of data elements representing the full channel state information (CSI) for generating the plurality of data elements in such a way that a fitting scheme applied to the selected predefined number of data elements results in a minimal residual fitting errors.

In a further possible implementation form of the third aspect, the processing unit is further configured to dynamically adapt the number of data elements to be selected from the set of data elements representing the full channel state information (CSI) for generating the plurality of data elements on the basis of a quality measure of the channel state information (CSI).

In a further possible implementation form of the third aspect, the processing unit is configured to select the number of data elements and the selected number of data elements from the set of data elements representing the full channel state information (CSI) for generating the plurality of data elements in such a way that a fitting scheme applied to the selected predefined number of data elements results in a minimal residual fitting errors.

In a further possible implementation form of the third aspect, the fitting scheme comprises fitting by a piecewise linear function.

In a further possible implementation form of the third aspect, the processing unit is further configured to quantize the subset of the set of data elements with a variable bit width.

In a further possible implementation form of the third aspect, each of the plurality of data elements can comprise phase information, amplitude information, a complex value, a real part of a complex value and/or an imaginary part of a complex value.

According to a fourth aspect the application relates to a corresponding method of operating a receiver communication device, wherein the method comprises the following steps: receiving a pilot signal from a transmitter communication device; generating a plurality of data elements representing channel state information (CSI) by selecting a subset of a set of data elements representing the full channel state information (CSI) being available at the receiver communication device; and transmitting the plurality of data elements representing channel state information (CSI) to the transmitter communication device.

The method according to the fourth aspect of the application can be performed by the receiver communication device according to the third aspect of the application. Further features of the method according to the fourth aspect of the application result directly from the functionality of the receiver communication device according to the third aspect of the application and its different implementation forms described above.

According to a fifth aspect the application relates to a computer program product comprising program code for performing the method of the second or the fourth aspect of the application, when executed on a computer or a processor.

The embodiments can be implemented in hardware and/or software.

BRIEF DESCRIPTION OF DRAWINGS

Further embodiments of the invention will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It will be appreciated that other aspects may be utilized and structural or logical changes may be made without departing from the scope of the present invention. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present invention covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

Figure 1:
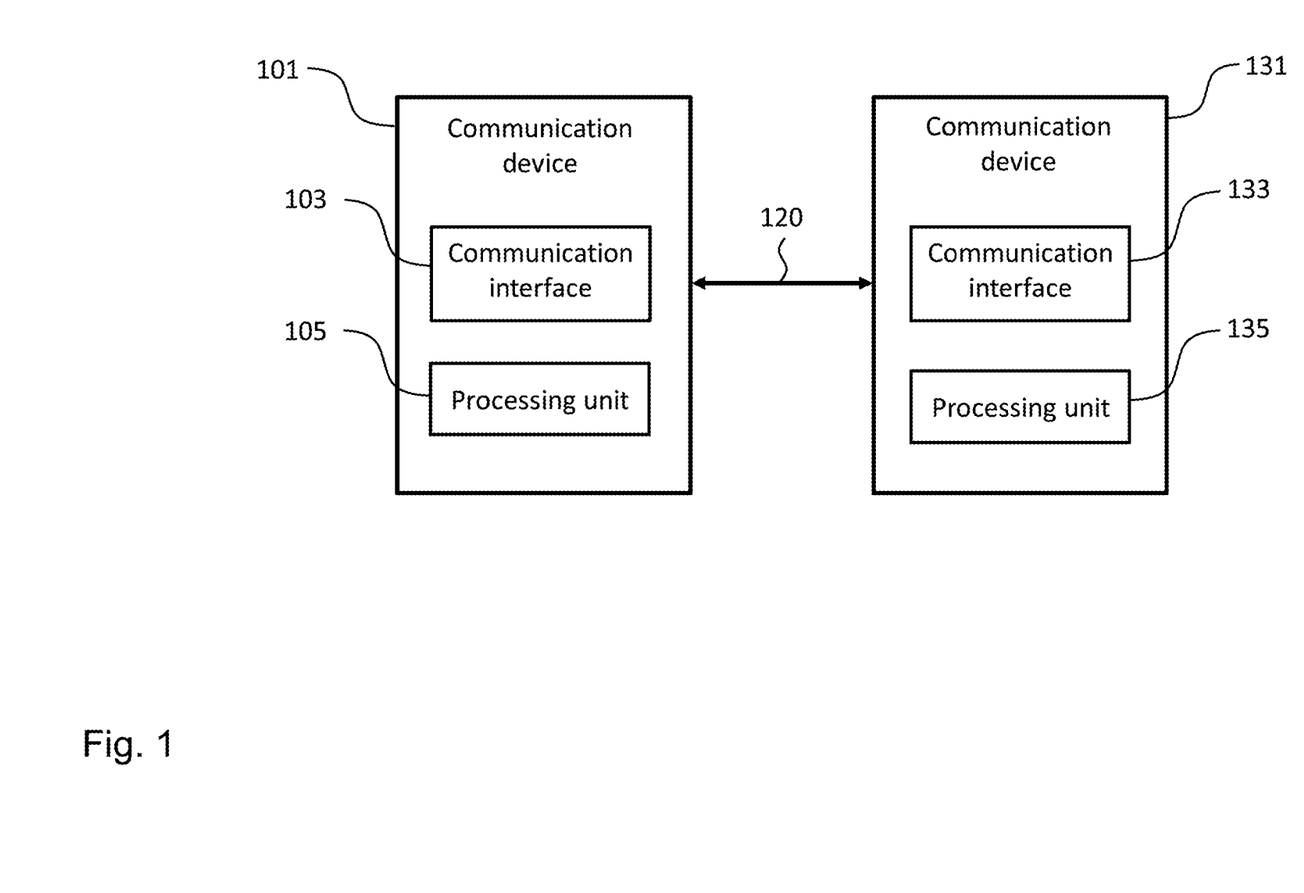
FIG. 1 shows a schematic diagram of a transmitter communication device according to an embodiment in communication with a receiver communication device according to an embodiment.

FIG. 1 shows a communication system 100 comprising a communication device 101 according to an embodiment and a communication device 131 according to an embodiment configured to communicate via a communication channel 120. In the following the communication device 101 will be also referred to as transmitter communication device 101 and the communication device 131 will be also referred to as receiver communication device 131. In an embodiment, the communication system 100 can be a wireless communication system 100. In an embodiment, the transmitter communication device 101 can be a base station 101. In an embodiment, the receiver communication device 131 can be a user equipment (UE) 131. As will be appreciated, the communication system 100 can comprise more than one transmitter communication device 101 and/or more than one receiver communication device 131.

As can be taken from FIG. 1 and as will be described in more detail further below, the transmitter communication device 101 comprises a communication interface 103 configured to transmit a pilot signal via the communication channel 120 to the receiver communication device 131. In an embodiment, the communication interface 103 of the transmitter communication device 101 can comprise one or more antennas. In an embodiment, the communication interface 103 is a MIMO communication interface 103.

The communication interface 103 of the transmitter communication device 101 is further configured to receive a plurality of data elements representing channel state information (CSI) defined, for instance, over a predefined time and/or frequency range from the receiver communication device 131, wherein the plurality of data elements are a subset of a set of data elements representing the full channel state information (CSI) over the predefined time and/or frequency range being available at the receiver communication device 131.

Furthermore, the transmitter communication device 101 comprises a processing unit 105 configured to generate the full channel state information (CSI) on the basis of the plurality of data elements by applying a fitting scheme to the plurality of data elements received from the receiver communication device 131, as will be described in more detail further below.

As can be taken from FIG. 1 and as will be described in more detail further below, the receiver communication device 131 comprises a communication interface 133 configured to receive a pilot signal from the transmitter communication device 101. In an embodiment, the communication interface 133 of the receiver communication device 131 can comprise one or more antennas.

Furthermore, the receiver communication device 131 comprises a processing unit 135 configured to generate the plurality of data elements representing the channel state information (CSI) by selecting a subset of the set of data elements representing the full channel state information (CSI) being available at the receiver communication device 131. The communication interface 133 of the receiver communication device 131 is further configured to transmit the plurality of data elements representing channel state information (CSI), i.e. the selected subset of the full CSI, to the transmitter communication device 101. For instance, in an embodiment the receiver communication device can sample a channel response functions over a predefined frequency range at 20 different frequencies (which defines the full channel state information (CSI) being available at the receiver communication device 131) and selecting 5 of these samples for transmission to the transmitter communication device 101.

Figure 2:
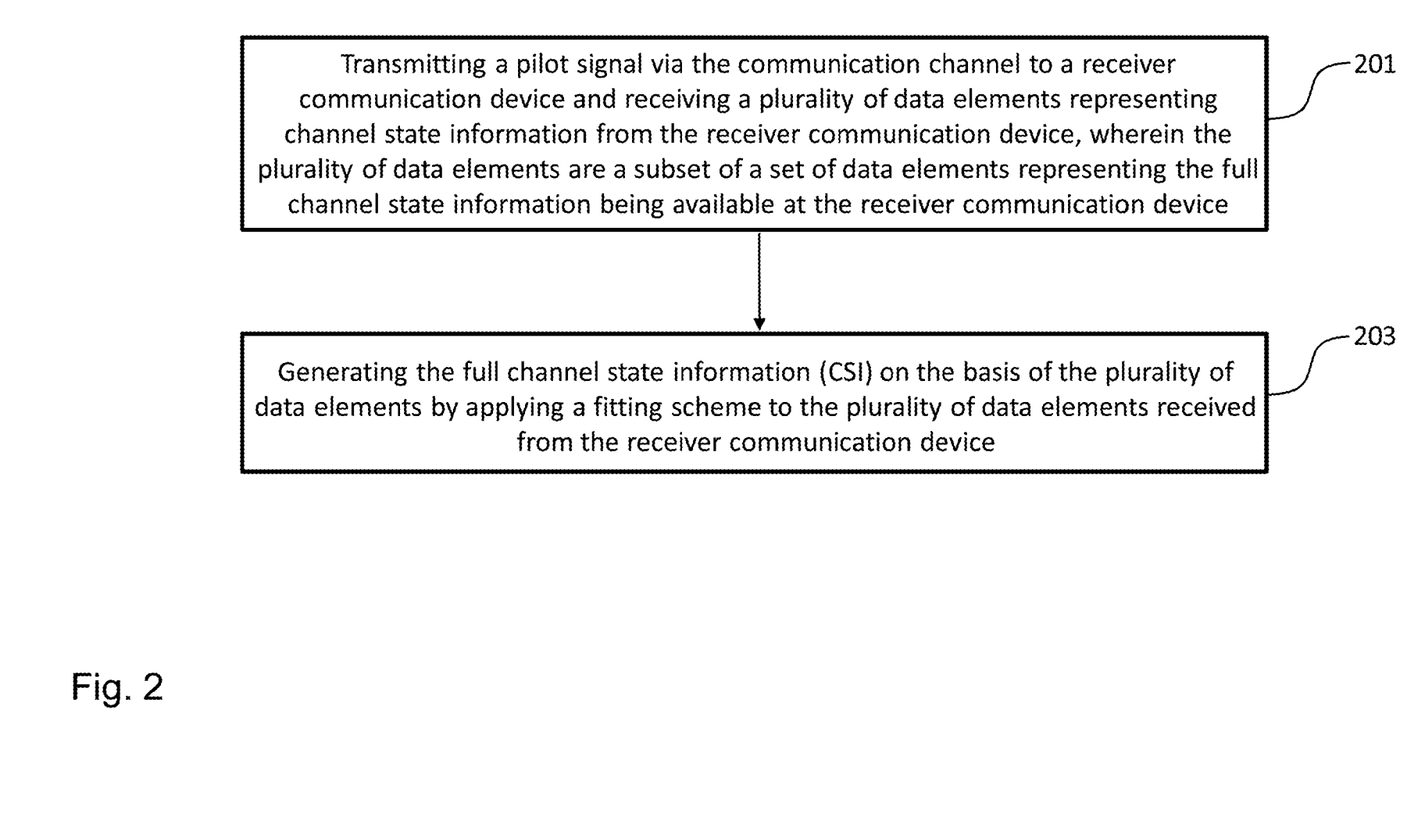
FIG. 2 shows a diagram illustrating steps of a method implemented in a transmitter communication device according to an embodiment.

FIG. 2 shows a diagram illustrating steps of a method 200 for operating the transmitter communication device 101 according to an embodiment. The method 200 comprises the steps of: transmitting 201 a pilot signal via the communication channel 120 to the receiver communication device 131 and receiving the plurality of data elements representing channel state information (CSI) from the receiver communication device 131, wherein the plurality of data elements are a subset of a set of data elements representing the full channel state information (CSI) being available at the receiver communication device 131; and generating 203 the full channel state information (CSI) on the basis of the plurality of data elements by applying a fitting scheme to the plurality of data elements received from the receiver communication device 131.

Figure 3:
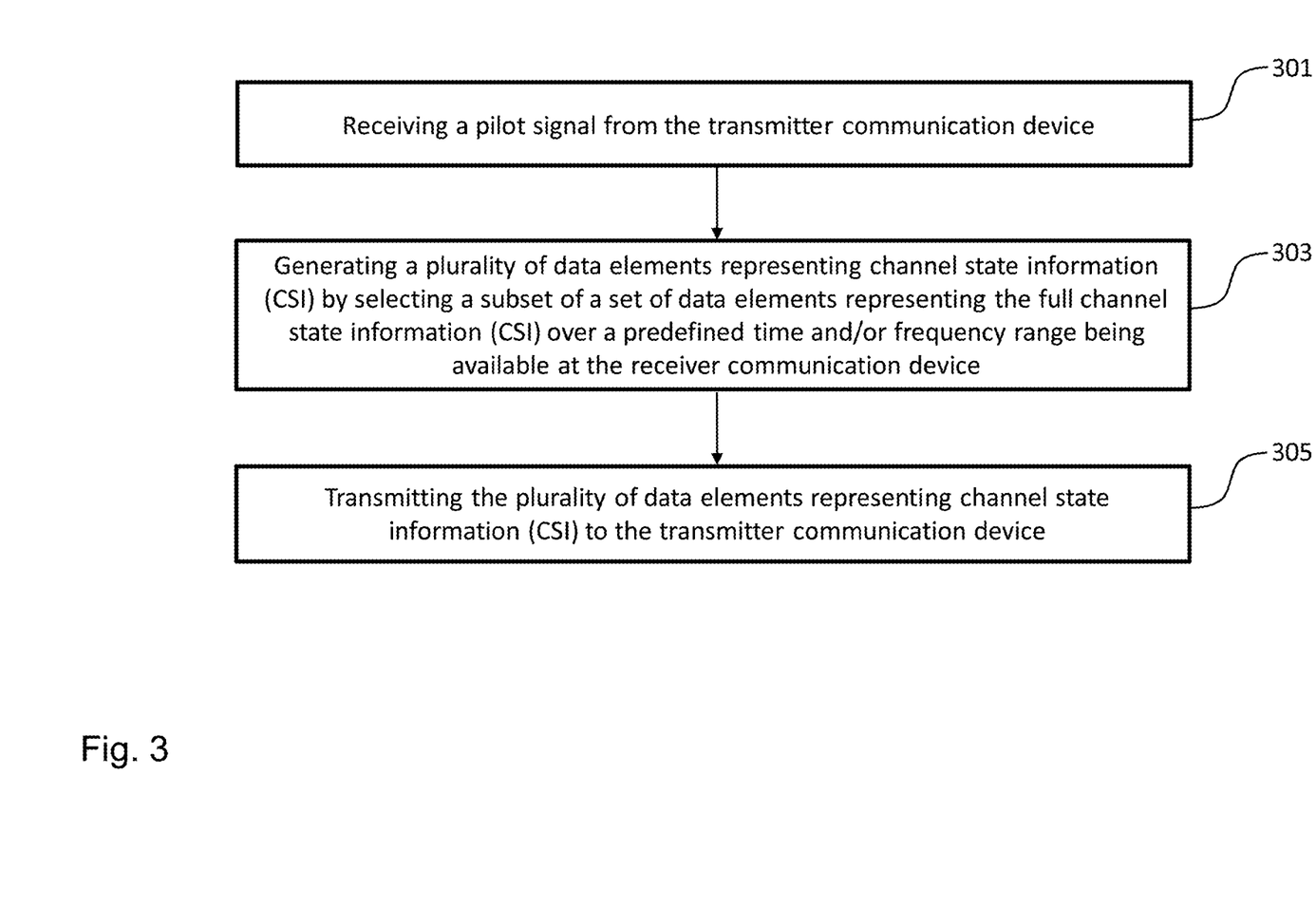
FIG. 3 shows a diagram illustrating steps of a method implemented in a receiver communication device according to an embodiment.

FIG. 3 shows a diagram illustrating steps of a method 300 for operating the receiver communication device 131 according to an embodiment. The method 300 comprises the steps of: receiving a pilot signal from the receiver communication device 101; generating 303 a plurality of data elements representing channel state information (CSI) by selecting a subset of a set of data elements representing the full channel state information (CSI) being available at the receiver communication device 131; and transmitting 305 the plurality of data elements representing channel state information (CSI) to the transmitter communication device 101.

Further embodiments of the transmitter communication device 101, the receiver communication device 131 and the methods 200 and 300 will be described in the following. In several of these embodiments the communication network 100 comprises more than one receiver communication devices, in particular user equipments 131.

In an embodiment, the channel 120 observed after the estimation by the i-th receiver communication device 131 can be expressed by means of one or multiple vectors $$h_{ij}=[h_{ij,1},\ldots,h_{ij,R}]\in S^R \quad (1)$$

wherein:

S denotes a normed subspace.

$h_{ij,k} \in S$, $\forall k \in [1, R] \cap \mathbb{N}$.

j∈[1,J]∩ℕ, with J denoting the number of estimated channel vectors, and J≥1 independently of the processing/estimation procedures performed by the receiver communication device(s) 131 on the received pilot signal or training sequences. For example, each receiver communication device 131 could estimate one channel vector per transmit/receive antenna pair, or per antenna port. Alternatively, J could be the number of virtual/equivalent channel vectors obtained through combining operations.

R denotes the amount of resources over which a channel vector is measured. For example, R could be the number of sub-carriers/resource blocks/resource block groups, if the estimation is performed in the frequency domain, or alternatively the duration of the channel impulse response in terms of number of sampling periods at the receiver communication device 131, if the estimation is performed in the time domain.

In an embodiment, the operations performed on $h_{ij}$ by the i-th receiver communication device 131 can be divided in two categories:

1. Selection/sampling/processing of the elements of $h_{ij}$ along R to reduce their number or guarantee that they satisfy a specific property/metric, which has been described above as selecting a subset of the set of data elements representing the full channel state information (CSI) being available at the receiver communication device 131.

2. Quantization of the components obtained after the selection/sampling/processing.

As will be appreciated, each element of a channel vector as defined in above equation (1) can always be mapped into several dependent or independent components, without loss of information if the mapping is invertible. The inverse mapping can be applied even on sampled versions of the components obtained at the previous step, even if the latter are independently sampled. Each component of a vector, evaluated across the entirety or the available resources over which it is measured, i.e., R, can be seen as a set of data that can be approximated by means of function fitting. Technically, fitting, or approximation in general, is to find under certain constraints the approximation of a function or a set of data with other functions that are more elementary or more manageable. In other words, the goal of this operation is to take known values of a function (possibly calculated by means of complex procedures) and identify a new function, or a set of functions, that is easier to evaluate and that can interpolate between, or extrapolate beyond, the known values. In embodiments of the application, this approximation can be targeted for a continuous domain or for a set of discrete points.

Accordingly, embodiments of the application are based on a CSI exchange scheme, which can be broken down into seven stages, as illustrated in FIGS. 3 to 9.

In a first stage of the CSI exchange scheme implemented in embodiments of the application, all the elements of each vector $h_{ij}$ can be remapped to yield an alternative representation of these elements, suitable for the subsequent operations. In an embodiment, this can be done by applying an invertible mapping $f: S > \mathcal{T}^L$, where $L \geq 1$, and $\mathcal{T}$ is a normed subspace, in general but not necessarily different from $\mathcal{S}$. For instance, if $\mathcal{S} = \mathbb{C}$ and $L=2$ then f could the invertible map that for any $h_{ij,k}$ yields $h_{ij,k}(1) = |h_{ij,k}|$ and $h_{ij,k}(2) = e^{j \angle h_{ij}}$, i.e., two quantities carrying information on the amplitude and the phase of $h_{ij,k}$. Alternatively, f could be the invertible map that for any $h_{ij,k}$ yields $h_{ij,k}(1) = \Re\{h_{ij,k}\}$ and $h_{ij,k}(2) = \mathcal{I}\{h_{ij,k}\}$ (with $\Re\{\cdot\}$ and $\mathcal{I}\{\cdot\}$ defined as operators that yield the real and imaginary parts of their complex argument, respectively). In a further embodiment, for a generic normed subspace S and L=1, f could also be the identity function mapping $h_{ij,k}$ to itself, i.e., $f(h_{ij,k}) = h_{ij,k}$.

In general, the operation described above can be mathematically expressed by defining f as an invertible map that for any $h_{ij,k}$ yields $$f(h_{ij,k}) = \begin{bmatrix} h_{ij,k}(1) \\ h_{ij,k}(2) \\ \vdots \\ h_{ij,k}(L) \end{bmatrix}$$

and its natural extension to $S^R$, induced by the Cartesian product, as the canonical invertible mapping $$g: S^R \to \underbrace{\mathcal{T}^L \times \mathcal{T}^L \times \ldots \times \mathcal{T}^L}_{R} = \mathcal{T}^{L \times R}$$

such that $$g(h_{ij}) = H_{ij} = \begin{bmatrix} h_{ij,1}(1) & h_{ij,2}(1) & & h_{ij,R}(1) \\ h_{ij,1}(2) & h_{ij,2}(2) & \ldots & h_{ij,R}(2) \\ \vdots & \vdots & & \vdots \\ \vdots & \vdots & & \vdots \\ h_{ij,1}(L) & h_{ij,2}(L) & \ldots & h_{ij,R}(L) \end{bmatrix}. \quad (2)$$

Figure 4:
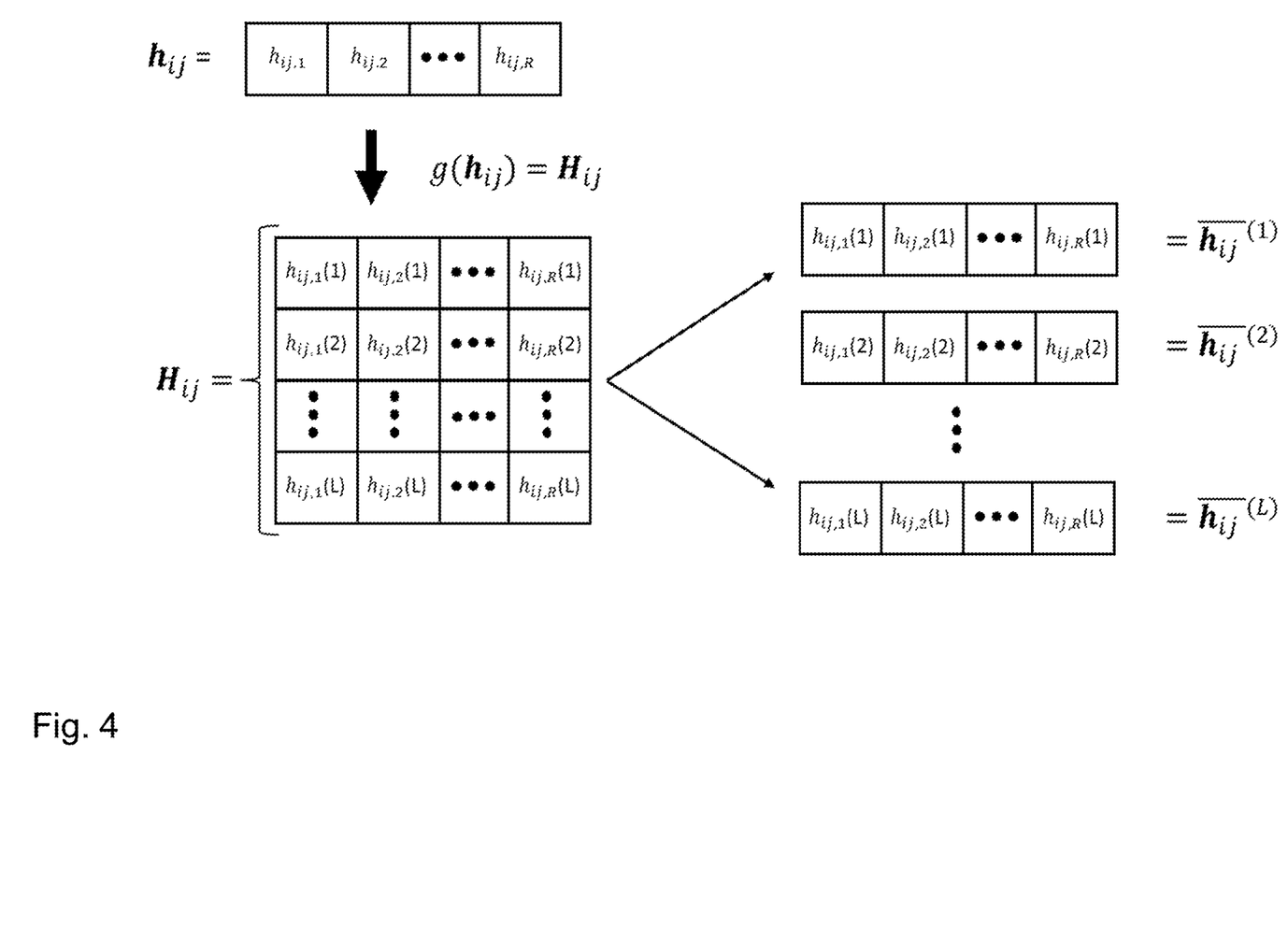
FIG. 4 shows a schematic diagram illustrating a first stage of a CSI exchange scheme implemented in communication devices according to an embodiment.

Finally, a set of vectors is defined as follows:

$\overline{h}_{ij}^{(m)} = [h_{ij,1}(m), \ldots, h_{ij,R}(m)], \forall m \in [1, L]$ which is obtained as the result of the projection $\text{proj}_m$: $\mathcal{T}^{L \times R} \to \mathcal{T}^R$. In this regard, it is noted that both f, g and $\text{proj}_m$ are known at both sides of the communication channel 120, i.e., by the transmitter communication device 101 and the receiver communication device 131. If this were not the case, the transmitter communication device 101 would not be able to reconstruct an estimation of all the vectors $h_{ij}$ using the selected subset received from the receiver communication device(s) 131. A graphical representation of the first stage of the CSI exchange scheme implemented in embodiments of the application is shown in FIG. 4.

Figure 5:
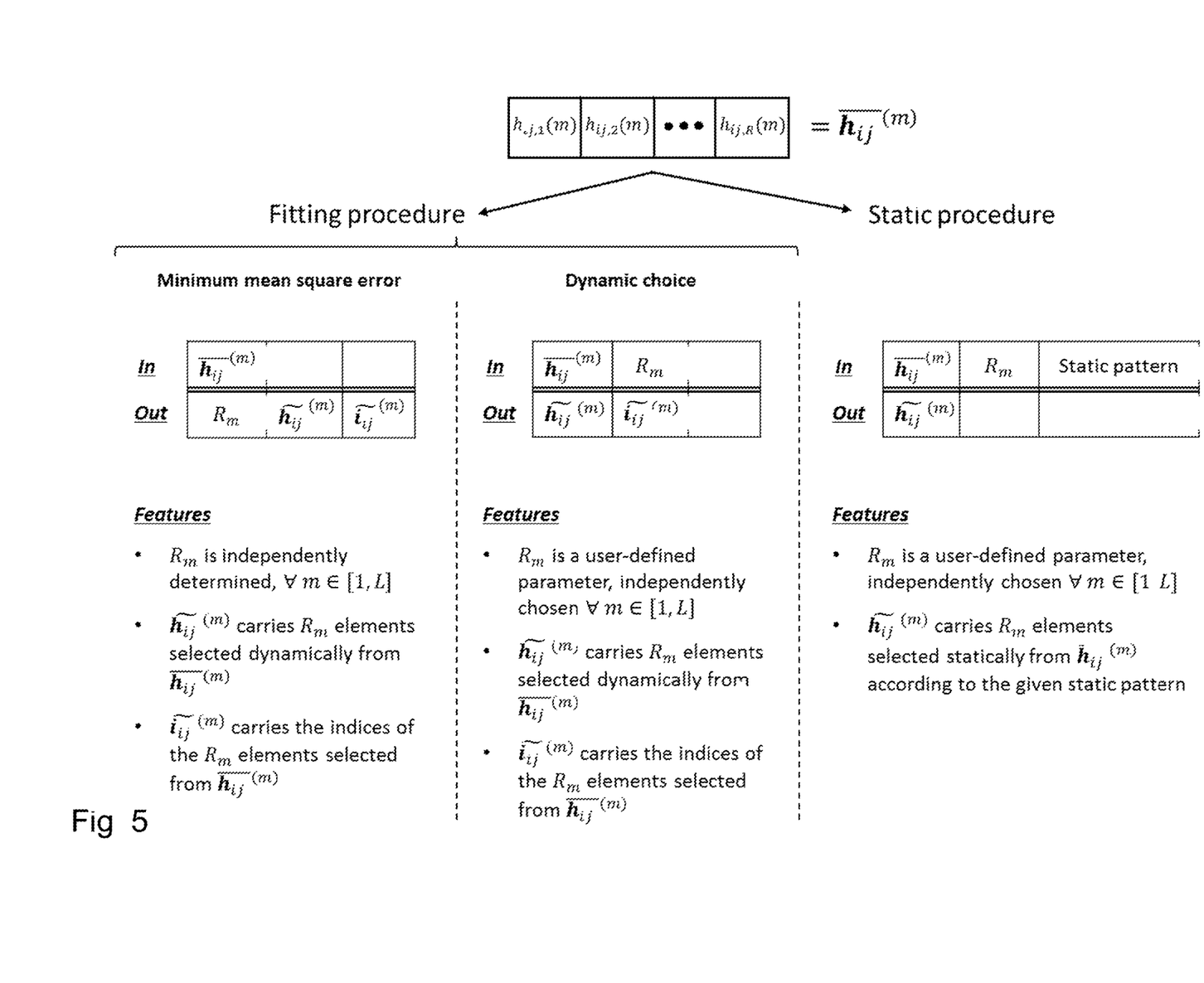
FIG. 5 shows a schematic diagram illustrating a second stage of a CSI exchange scheme implemented in communication devices according to an embodiment.

In a second stage of the CSI exchange scheme implemented in embodiments of the application, which is illustrated in FIG. 5, each $\overline{h}_{ij}^{(m)}$ can be processed to extract, i.e. select, a number $R_m \geq 0$ of its elements, where all the $R_m$ may or may not be identical. This operation is not invertible and in general yields m vectors of different lengths, which are denoted as $\widetilde{h}_{ij}^{(m)}$. According to embodiments of the application, both the number and the selection of the $R_m$ elements constituting the vectors $\widetilde{h}_{ij}^{(m)}$, $\forall m \in [1, L]$ and for each vector, can be determined by means of a fitting procedure where each vector $\overline{h}_{ij}^{(m)}$ is seen as a data set to be approximated by means of a piecewise function. Accordingly, $R_m$ is in general different for all the vectors $\overline{h}_{ij}^{(m)}$ and can be determined, for instance, according to one of the following embodiments.

In a first embodiment based on minimum square errors, both the value of $R_m$, $\forall m \in [1, L]$ and the choice of the retained elements after the selection, i.e., the elements in $\widetilde{h}_{ij}^{(m)}$, are determined by the processing unit 135 of the receiver communication device 131 in order to minimize the mean square error of the fitting. The indices of the retained elements are then stored in separate vectors $\widetilde{\iota}_{ij}^{(m)} \in [1, R] \cap \mathbb{N}$. This embodiment yields a couple of output vectors ($\widetilde{h}_{ij}^{(m)}, \widetilde{\iota}_{ij}^{(m)}$) for each input vector $\overline{h}_{ij}^{(m)}$.

In a further embodiment relating to a dynamic choice or selection of the data elements, $R_m$ is a user-defined parameter, which in general can be different for all the vectors $\overline{h}_{ij}^{(m)}$, $\forall m \in [1, L]$. The retained elements are independently selected from each vector $\overline{h}_{ij}^{(m)}$ by the receiver communication device(s) 131, and sequentially chosen to yield the vectors $\widetilde{h}_{ij}^{(m)}$ in order to minimize the residual fitting error after each choice. The indices of the retained elements are then stored in separate vectors $\widetilde{\iota}_{ij}^{(m)} 1 \in [1, R] \cap \mathbb{N}$. This embodiment yields a couple of output vectors ($\widetilde{h}_{ij}^{(m)}, \widetilde{\iota}_{ij}^{(m)}$) for each input vector $\overline{h}_{ij}^{(m)}$.

In a further embodiment relating to a static choice or selection of the data elements, $R_m$ is again a user-defined parameter, which in general can be different for all the vectors $\overline{h}_{ij}^{(m)}$, $\forall m \in [1, L]$. In this embodiment, however, the $R_m$ retained elements from $\overline{h}_{ij}^{(m)}$ are statically chosen by the receiver communication device(s) 131 in order for their indices to follow a pattern known and agreed upon by both the transmitter communication device 101 and the receiver communication device(s) 131 in the context of the underlying communication protocol/standard. Accordingly, this pattern does not need to be part of the signaling message(s) sent from the receiver communication device(s) 131 to the transmitter communication device 101. For instance, let R=13, m=1 and $R_1$=3. In this case, $\widetilde{h}_{ij}^{(1)}$ could carry only the $1^{st}$, $7^{th}$ and $13^{th}$ element of $\overline{h}_{ij}^{(1)}$, or other elements according to an alternative pattern. This embodiment yields one output vector $\widetilde{h}_{ij}^{(m)}$ for each input vector $\overline{h}_{ij}^{(m)}$.

Figure 6:
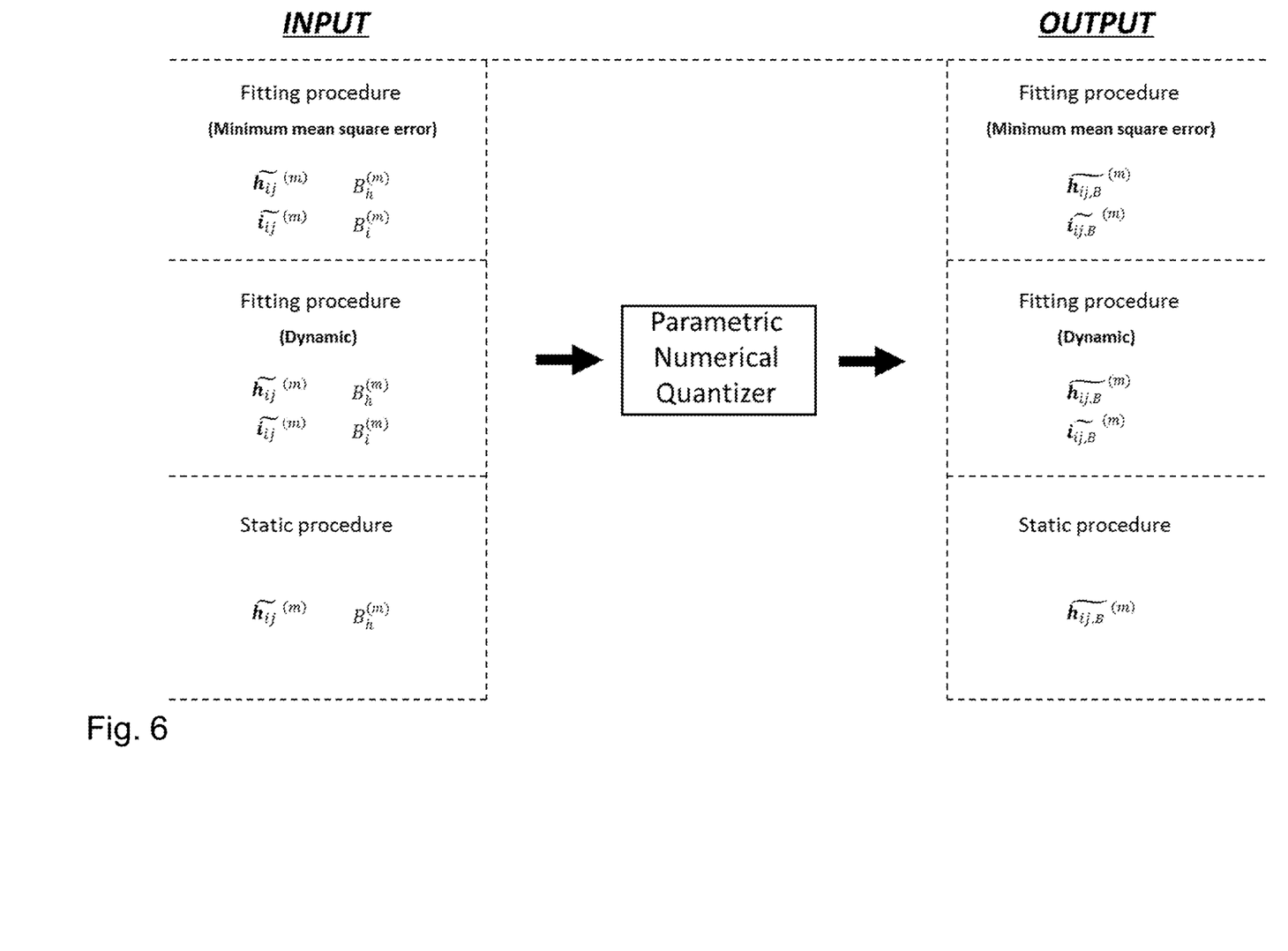
FIG. 6 shows a schematic diagram illustrating a third stage of a CSI exchange scheme implemented in communication devices according to an embodiment.
Figure 7:
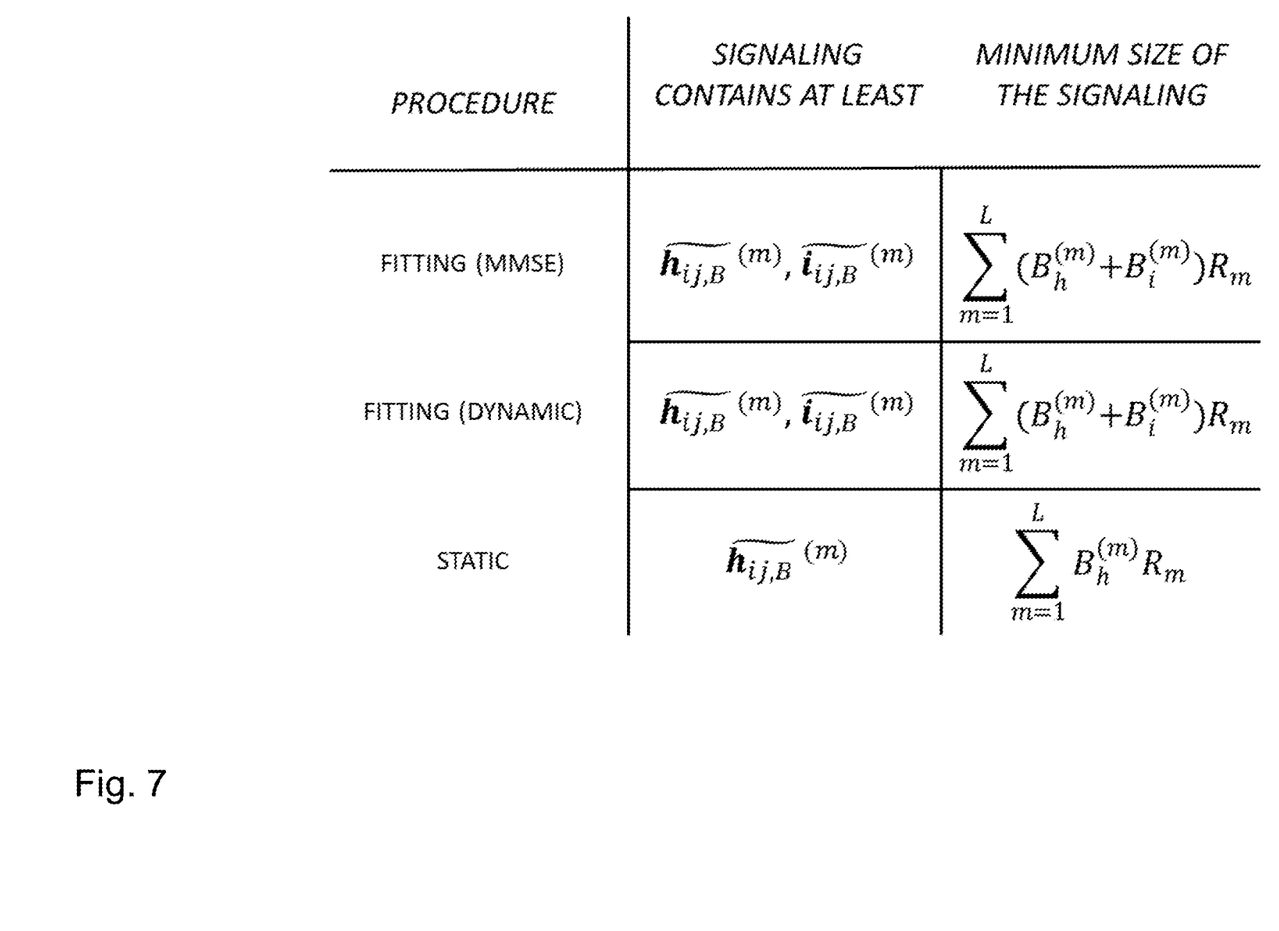
FIG. 7 shows a schematic diagram illustrating different aspects of the invention.

In a third stage of the CSI exchange scheme implemented in embodiments of the application, which is illustrated in FIG. 6, a parametric quantization can be performed over all the vectors $\widetilde{h}_{ij}^{(m)}$ (and $\widetilde{\iota}_{ij}^{(m)}$, whenever present) to yield vectors $\widetilde{h}_{ij,B}^{(m)}$ (resp. $\widetilde{h}_{ij,B}^{(m)}$). In particular, $B_h^{(m)}$ and $B_t^{(m)}$ bits can be used to quantize each element of $\widetilde{h_{i,j}}^{(m)}$ and $\widetilde{\iota_{i,j,B}}^{(m)}$ (whenever present), respectively. In other words, embodiments of the application make use of a numerical quantizer which supports different bit widths, and thus different levels of precision. More precisely, the quantizer can operate on each input vector using different $B_h^{(m)}$ and $B_i^{(m)}$, and yields output vectors $\widetilde{h_{i,j,B}}^{(m)}$ (resp. $\widetilde{\iota_{i,j,B}}^{(m)}$) of length $B_h^{(m)}R_m$ (resp. $B_i^{(m)}R_m$), $\forall m \in [1, L]$.

In a fourth stage of the CSI exchange scheme implemented in embodiments of the application, the signaling for transmission to the transmitter communication device 101 is generated. The size of the signaling depends on the adopted policy to build the vectors $\widetilde{h_{i,j}}^{(m)}$. In particular, if a fitting procedure is adopted in the second stage, then the signaling carries information related to at least the vectors $\widetilde{h_{i,j,B}}^{(m)}$ and $\widetilde{\iota_{i,j,B}}^{(m)}$, $\forall m \in [1, L]$, which implies the transmission of at least $\Sigma_{m=1}^{L}(B_h^{(m)}+B_i^{(m)})R_m$ bits per signaling period. Alternatively, if a static selection is applied in the second stage, then the signaling carries information related to at least the vectors $\widetilde{h_{i,j,B}}^{(m)}$, $\forall m \in [1, L]$, which implies the transmission of at least $\Sigma_{m=1}^{L}B_h^{(m)}R_m$ bits per signaling period. A summary of the signaling for each of the aforementioned cases is provided in FIG. 7.

In a fifth stage of the CSI exchange scheme implemented in embodiments of the application, the signaling comprising the selected subset of data elements is performed by the receiver communication device(s) 131 via the communication channel 120 to the transmitter communication device 101 according to the underlying communication protocol/standard implemented in the communication network 100.

In embodiments of the application, the stages 1 to 5 described above can be part of an even more sophisticated CSI exchange scheme which accounts for interactions between the communication devices aiming at optimizing the performance of the communication network 100 in terms of reduction of redundancy for the CSI signaling overhead. Accordingly, embodiments of the application comprise the following further stages.

Figure 8:
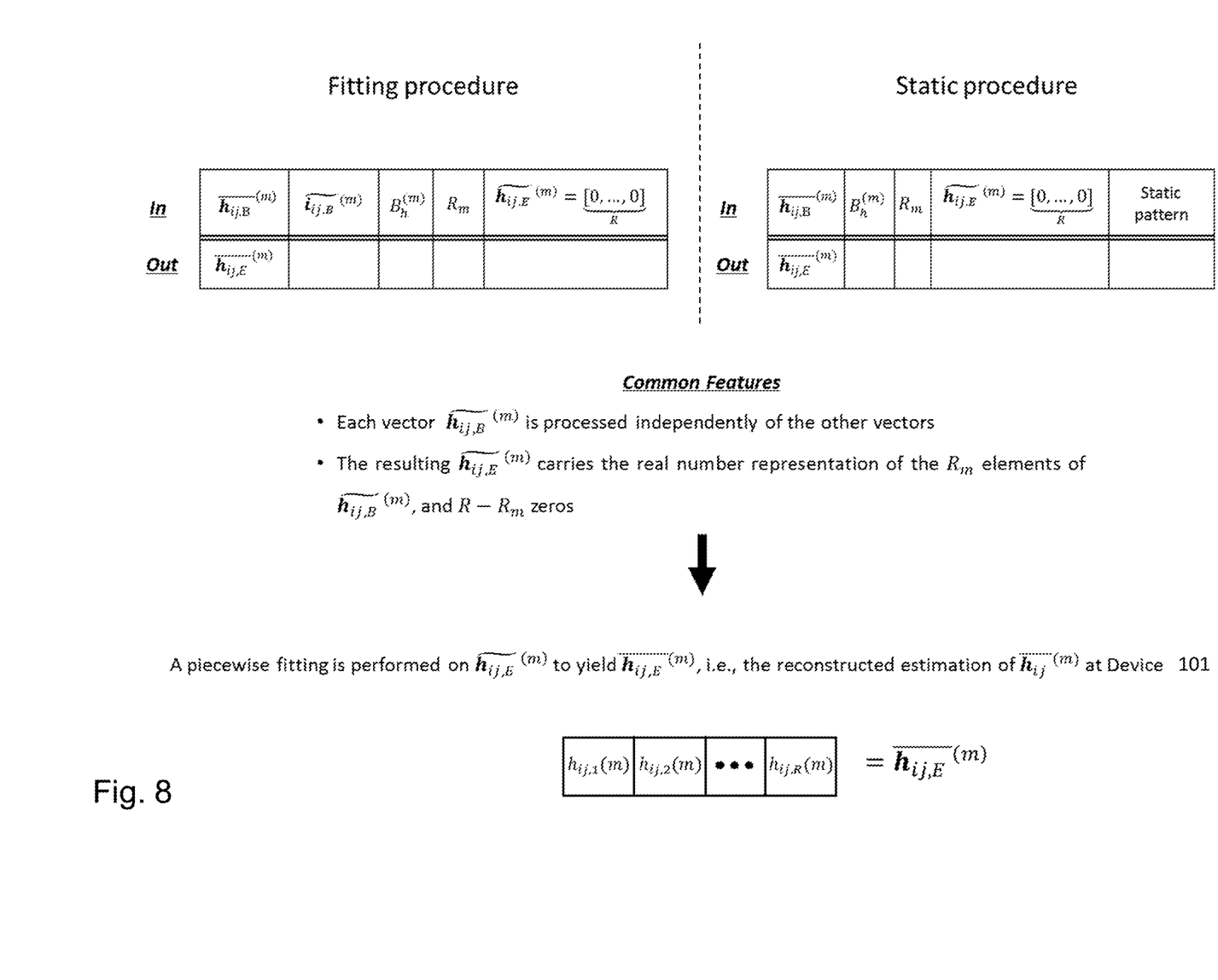
FIG. 8 shows a schematic diagram illustrating a sixth stage of a CSI exchange scheme implemented in communication devices according to an embodiment.

In a sixth stage of the CSI exchange scheme implemented in embodiments of the application, the transmitter communication device 101 reconstructs an estimate of the vectors $\overline{h_{ij}}^{(m)}$ by means of a piecewise fitting of the plurality of data elements provided by the receiver communication device(s) 131.

Depending on the procedure adopted by the receiver communication device(s) 131 for determining the number and the selection of the $R_m$ elements constituting the vectors $\widetilde{h_{i,j}}^{(m)}$, $\forall m \in [1, L]$, the piecewise fitting can be implemented, for instance, on the basis of either one of the two following approaches.

In an embodiment based on a dynamic fitting approach, each couple $(\widetilde{h_{i,j,B}}^{(m)}, \widetilde{\iota_{i,j}}^{(m)})$ can be processed by the processing unit 105 of the transmitter communication device 101 independently of the other couples. First, a vector $\widetilde{h_{i,j,E}}^{(m)}$ with R elements set to zeros is initialized. Then, the $R_m$ elements of $\widetilde{h_{i,j,E}}^{(m)}$ corresponding to the $R_m$ indices carried in $\widetilde{\iota_{i,j}}^{(m)}$ (after transforming them in their natural number representation) are set to the corresponding elements of $\widetilde{h_{i,j,B}}^{(m)}$ (previously transformed in their real number representation). The resulting $\widetilde{h_{i,j,E}}^{(m)}$ then carries the real number representation of the $R_m$ elements of $\widetilde{h_{i,j}}^{(m)}$, and $R-R_m$ zeros.

In an embodiment based on a static fitting approach, each vector $\widetilde{h_{i,j,B}}^{(m)}$ is processed by the processing unit 105 of the receiver communication device 101 independently of the other vectors. First, a vector $\widetilde{h_{i,j,E}}^{(m)}$ with R elements set to zeros is initialized. Then, the $R_m$ elements of $\widetilde{h_{i,j,E}}^{(m)}$ corresponding to the $R_m$ static indices, known and agreed upon by both the transmitter communication device 101 and the receiver communication device(s) 131 in the context of the underlying communication protocol/standard, are set to the real number representation of the corresponding elements of $\widetilde{h_{i,j,B}}^{(m)}$. The resulting $\widetilde{h_{i,j,E}}^{(m)}$ then carries the real number representation of the $R_m$ elements of $\widetilde{h_{i,j,B}}^{(m)}$, and $R-R_m$ zeros.

In both embodiments, a piecewise fitting (preferably a piecewise linear fitting) is performed by the processing unit 105 of the transmitter communication device 101 on $\widetilde{h_{i,j,E}}^{(m)}$ to yield $\overline{h_{ij,E}}^{(m)}$, i.e., the reconstructed estimate of $\overline{h_{ij}}^{(m)}$ at the transmitter communication device 101.

Figure 9:
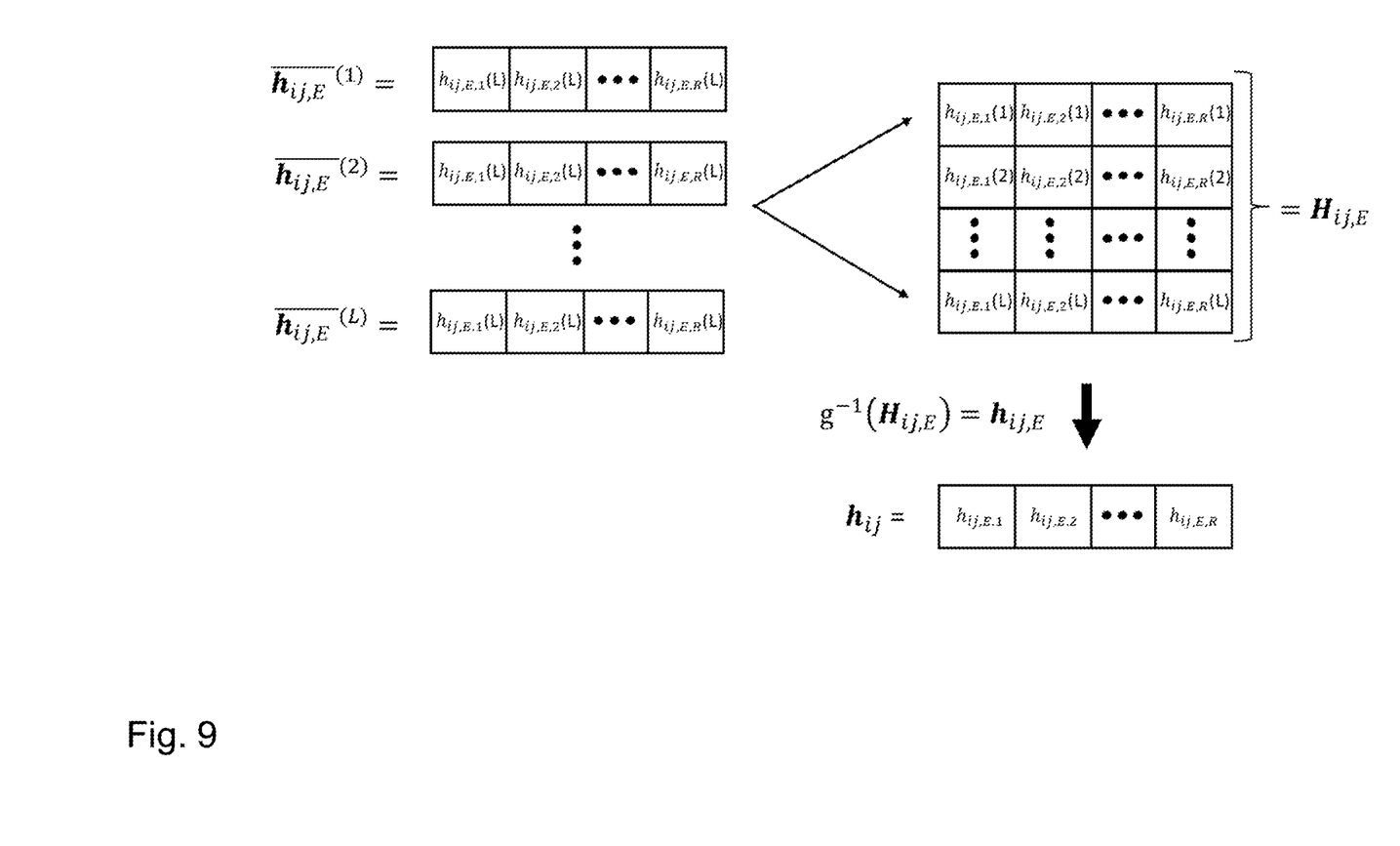
FIG. 9 shows a schematic diagram illustrating a seventh stage of a CSI exchange scheme implemented in communication devices according to an embodiment.

In a last stage of the CSI exchange scheme implemented in embodiments of the application, the processing unit 105 of the receiver communication device 101 takes all the vectors $\overline{h_{ij,B}}^{(m)}$ and reconstructs an estimate of the matrices $H_{ij}$, as per equation (2) and denoted in the following as $H_{ij,E}$, given by $$H_{ij,E} = \begin{bmatrix} \overline{h_{ij,E}}^{(1)} \\ \overline{h_{ij,E}}^{(2)} \\ \vdots \\ \overline{h_{ij,E}}^{(L)} \end{bmatrix}.$$

Finally, the vectors $h_{ij,E}$, i.e., the reconstructed version of the vectors $h_{ij,E}$, are obtained by the processing unit 105 of the transmitter communication device 101 by application of the inverse map $g^{-1}$, that is $$h_{ij,E} = g^{-1}(H_{ij,E}).$$

In an embodiment, the considered wireless communication system 100 is a Massive MIMO system 100 operating in FDD, in which the transmitter communication device 101 in the form of a base station 101 requires one or more receiver communication devices 131 in the form of one or more user equipments 131 to feedback signaling on their estimated downlink CSI. In this embodiment, the one or more user equipments 131 estimate the response of one or a plurality of downlink channels 120, over R time or frequency resources, by means of any conventional channel estimation technique, possibly including additional processing performed in the context of the estimation (by means of linear or non-linear operations). This yields the vectors $h_{ij} \in \mathbb{C}^R$, $\forall j \in [1,J] \cap \mathbb{N}$, with $J \geq 1$ denoting the number of estimated channel vectors, independently of the processing/estimation performed by the user equipment(s) 131 on the received pilot sequences. Alternatively J could be the number of virtual/equivalent channel vectors obtained through combining operations. In this embodiment, the CSI exchange scheme can comprise the following stages.

The one or more user equipments 131 map the vector $h_{ij}$ into the vectors $\overline{h_{ij}}^{(1)} = |h_{ij}|$ and $\overline{h_{ij}}^{(2)} = e^{j \angle h_{ij}}$ (or alternatively $\overline{h_{ij}}^{(1)} = \mathcal{I}\{h_{ij}\}$ and $\overline{h_{ij}}^{(2)} = \mathcal{I}\{h_{ij}\}$).

The one or more user equipments 131 extract $R_1$ and $R_2$ elements from $\overline{h_{ij}}^{(1)}$ and $\overline{h_{ij}}^{(2)}$, respectively, in which $R_1$ and $R_2$ are not necessarily identical, and according to a static pattern known and agreed upon by the base station 101 and the user equipment(s) 131. This operation yields the two vectors $\widetilde{h_{i,j}}^{(1)}$ and $\widetilde{h_{i,j}}^{(2)}$, which carry $R_1$ elements of $\overline{h_{ij}}^{(1)}$ and $R_2$ elements of $\overline{h_{ij}}^{(2)}$, respectively.

The one or more user equipments 131 perform a variable-bit-width numerical quantization of $\widetilde{h_{i,j}}^{(1)}$ and $\widetilde{h_{i,j}}^{(2)}$ to yield the vectors $\widetilde{h_{i,j,B}}^{(1)}$ and $\widetilde{h_{i,j,B}}^{(2)}$, respectively. In particular, $B_h^{(1)}$ bits are used to quantize each element of $\widetilde{h_{i,j}}^{(1)}$, whereas $B_h^{(2)}$ bits are used to quantize each element of $\widetilde{h_{i,j}}^{(2)}$. Hence, $\widetilde{h_{i,j,B}}^{(2)}$ and $\widetilde{h_{i,j}}^{(2)}$ carry $B_h^{(1)}R_1$ and $B_h^{(2)}R_2$ bits, respectively.

The one or more user equipments 131 generate the signaling which carries at least information related to the vectors $\widetilde{h_{i,j,B}}^{(1)}$ and $\widetilde{h_{i,j,B}}^{(2)}$. This implies the transmission of at least $B_{TOT} = B_h^{(1)}R_1 + B_h^{(2)}R_2$ bits per user equipment 131 per signaling period.

The one or more user equipments 131 perform the signaling towards the at least one base station 101 according to the underlying communication protocol/standard implemented in the communication network 100.

In particular, above-described five steps/stages can be included in a larger procedure which accounts for interactions between the devices aiming at optimizing the performance of the system in terms of reduction of redundancy for the CSI signaling overhead.

Upon reception of the signaling from the one or more user equipments 131 the base station 101 reconstructs an estimate of the vectors $\overline{h_{ij}}^{(1)}$, $\overline{h_{ij}}^{(2)}$ by means of a piecewise fitting of the vectors $\widetilde{h_{i,j,B}}^{(1)}$ and $\widetilde{h_{i,j,B}}^{(2)}$, respectively. To this end, the base station can initialize two vectors with R elements set to zeros, i.e., $\widetilde{h_{i,j,E}}^{(1)}$ and $\widetilde{h_{i,j,E}}^{(2)}$. Then, the base station 101 sets the $R_1$ (resp. $R_2$) elements of the vector $\widetilde{h_{i,j,E}}^{(1)}$ (resp. $\widetilde{h_{i,j,E}}^{(2)}$) corresponding to the $R_1$ (resp. $R_2$) static indices, known and agreed upon by both the base station 101 and the one or more user equipments 131 in the context of the underlying communication protocol/standard, to the real number representation of the corresponding elements of $\widetilde{h_{i,j,B}}^{(1)}$ and $\widetilde{h_{i,j,B}}^{(2)}$. The resulting vector $\widetilde{h_{i,j,E}}^{(1)}$ (resp. $\widetilde{h_{i,j,E}}^{(2)}$) then carries the real number representation of the $R_1$ (resp. $R_2$) elements of $\widetilde{h_{i,j,B}}^{(1)}$ (resp. $\widetilde{h_{i,j,E}}^{(2)}$), and $R-R_1$ (resp. $R-R_2$) zeroes. Finally, the base station 101 performs a piecewise fitting on $\widetilde{h_{i,j,E}}^{(2)}$ and $\widetilde{h_{i,j,E}}^{(2)}$ to obtain $\overline{h_{ij,E}}^{(m)}$ and $\overline{h_{ij,E}}^{(2)}$, respectively, i.e., the reconstructed estimates of $\overline{h_{ij}}^{(1)}$ and $\overline{h_{ij}}^{(2)}$.

In an embodiment, the processing unit 105 of the transmitter communication device 101 is configured to map $\overline{h_{ij,E}}^{(1)}$ and $\overline{h_{ij,E}}^{(2)}$ into the reconstructed estimates of $h_{ij}$, i.e., $h_{ij,E}$, by means of the following operation:

$$h_{ij,E} = \overline{h_{ij,E}}^{(1)} e^{j\overline{h_{ij,E}}^{(2)}}.$$

In an alternative embodiment, the processing unit 105 of the transmitter communication device 101 is configured to use the operation $h_{ij,E} = \overline{h_{ij,E}}^{(1)} + j\overline{h_{ij,E}}^{(2)}$, depending on which map has been adopted in the second stage of the CSI exchange scheme described above.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A first communication device, comprising:
   a communication interface configured to transmit a pilot signal via a communication channel to a second communication device and to receive a plurality of data elements representing channel state information (CSI) from the second communication device, wherein the plurality of data elements are generated by selecting a subset of a set of data elements representing the full CSI over at least one of a predefined time and a predefined frequency range being available at the second communication device; and
   a processor configured to generate the set of data elements representing the full CSI based on the plurality of data elements by applying a fitting scheme to the plurality of data elements received from the second communication device.

2. The first communication device of claim 1, wherein the processor is configured to generate the full CSI based on the plurality of data elements by applying a piecewise linear fitting scheme to the plurality of data elements received from the second communication device.

3. The first communication device of claim 1, wherein the processor is further configured to determine a respective frequency or a respective time associated with each data element of the plurality of data elements based on data received from the second communication device.

4. The first communication device of claim 1, wherein the full CSI comprises at least one of a frequency response, a time response and a spatial response of the communication channel to the pilot signal.

5. The first communication device of claim 1, wherein each of the plurality of data elements comprises phase information, amplitude information, a complex value, at least one of a real part of a complex value and an imaginary part of a complex value.

6. A method of operating a first communication device, wherein the method comprises:
    transmitting a pilot signal via a communication channel to a second communication device and receiving a plurality of data elements representing channel state information (CSI) from the second communication device, wherein the plurality of data elements are generated by selecting a subset of a set of data elements representing the full CSI over at least one of a predefined time and a predefined frequency range being available at the second communication device; and
    generating the set of data elements representing the full CSI based on the plurality of data elements by applying a fitting scheme to the plurality of data elements received from the second communication device.

7. A first communication device, comprising:
    a communication interface configured to receive a pilot signal from a second communication device; and
    a processor configured to generate a plurality of data elements representing channel state information (CSI) by selecting a subset of a set of data elements representing the full CSI over at least one of a predefined time and a predefined frequency range being available at the first communication device;
    wherein the communication interface is further configured to transmit the plurality of data elements representing the CSI to the second communication device.

8. The first communication device of claim 7, wherein the processor is configured to select a predefined number of data elements from the set of data elements representing the full CSI for generating the plurality of data elements.

9. The first communication device of claim 8, wherein the processor is configured to select predefined data elements from the set of data elements representing the full CSI for generating the plurality of data elements.

10. The first communication device of claim 8, wherein the processor is configured to select the predefined number of data elements from the set of data elements representing the full CSI for generating the plurality of data elements in such a way that a fitting scheme applied to the selected predefined number of data elements results in minimal residual fitting errors.

11. The first communication device of claim 8, wherein the processor is further configured to dynamically adapt the number of data elements to be selected from the set of data elements representing the full CSI for generating the plurality of data elements based on a quality measure of the CSI.

12. The first communication device of claim 8, wherein the processor is configured to select the number of data elements as well as the selected number of data elements from the set of data elements representing the full CSI for generating the plurality of data elements in such a way that a fitting scheme applied to the selected predefined number of data elements results in a-minimal residual fitting errors.

13. The first communication device of claim 10, wherein the fitting scheme comprises fitting by a piecewise linear function.

14. The first communication device of claim 7, wherein the processor is further configured to quantize the subset of the set of data elements with a variable bit width.

15. The first communication device of claim 7, wherein each of the plurality of data elements comprises phase information, amplitude information, a complex value, at least one of a real part of a complex value and an imaginary part of a complex value.

\* \* \* \* \*

UNITED STATES PATENT AND TRADEMARK OFFICE
CERTIFICATE OF CORRECTION

PATENT NO. : 11,444,736 B2
APPLICATION NO. : 16/692780
DATED : September 13, 2022
INVENTOR(S) : Nguyen et al.

It is certified that error appears in the above-identified patent and that said Letters Patent is hereby corrected as shown below:

On the Title Page

Foreign Application Priority Data item (30):
"May 23, 2017 (WO) ............... PCT/EP2017/062377"
Should read:
-- May 23, 2017 (EP) ............... PCT/EP2017/062377 --.

Signed and Sealed this
Thirty-first Day of January, 2023

Katherine Kelly Vidal
*Director of the United States Patent and Trademark Office*